US006965939B2

(12) United States Patent
Cuomo et al.

(10) Patent No.: US 6,965,939 B2
(45) Date of Patent: Nov. 15, 2005

(54) METHOD AND APPARATUS FOR PROCESSING REQUESTS IN A NETWORK DATA PROCESSING SYSTEM BASED ON A TRUST ASSOCIATION BETWEEN SERVERS

(75) Inventors: Gennaro A. Cuomo, Apex, NC (US); Wilfred C. Jamison, Raleigh, NC (US); Nataraj Nagaratnam, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 09/755,351

(22) Filed: Jan. 5, 2001

(65) Prior Publication Data

US 2002/0091757 A1 Jul. 11, 2002

(51) Int. Cl.[7] .............................................. H04L 9/00
(52) U.S. Cl. ...................... 709/229; 713/155; 713/168; 713/200; 709/203
(58) Field of Search ................................ 709/203, 219, 709/225; 713/155, 156, 159, 160, 172, 154, 713/165, 168, 175, 176, 200–202

(56) References Cited

U.S. PATENT DOCUMENTS

| | | | | |
|---|---|---|---|---|
| 5,968,176 A | * | 10/1999 | Nessett et al. | 713/201 |
| 5,991,810 A | * | 11/1999 | Shapiro et al. | 709/229 |
| 6,006,258 A | * | 12/1999 | Kalajan | 709/219 |
| 6,088,796 A | * | 7/2000 | Cianfrocca et al. | 713/152 |
| 6,115,040 A | * | 9/2000 | Bladow et al. | 345/741 |
| 6,167,522 A | * | 12/2000 | Lee et al. | 713/201 |
| 6,212,192 B1 | * | 4/2001 | Mirashrafi et al. | 370/401 |
| 6,212,640 B1 | * | 4/2001 | Abdelnur et al. | 713/201 |
| 6,298,407 B1 | * | 10/2001 | Davis et al. | 710/314 |
| 6,317,838 B1 | * | 11/2001 | Baize | 713/201 |
| 6,363,478 B1 | * | 3/2002 | Lambert et al. | 713/151 |
| 6,363,479 B1 | * | 3/2002 | Godfrey et al. | 713/160 |
| 6,463,474 B1 | * | 10/2002 | Fuh et al. | 709/225 |
| 6,564,274 B1 | * | 5/2003 | Heath et al. | 710/105 |
| 6,584,505 B1 | * | 6/2003 | Howard et al. | 709/225 |
| 6,631,417 B1 | * | 10/2003 | Balabine | 709/229 |
| 6,701,438 B1 | * | 3/2004 | Prabandham et al. | 713/201 |
| 6,782,294 B2 | * | 8/2004 | Reich et al. | 700/19 |

* cited by examiner

*Primary Examiner*—John Follansbee
*Assistant Examiner*—Aaron C. Perez-Daple
(74) *Attorney, Agent, or Firm*—Yee & Associates, P.C.; A. Bruce Clay

(57) ABSTRACT

A method, apparatus, and computer implemented instructions for handling requests in a network data processing system. The network data processing system includes a network and clients connected to the network. A first server is present in which the first server receives a request from a client to access a resource, performs an authentication process with the client, add information to the request in which the information indicates that the request is from a trusted source to form a modified request, and sends the modified request for processing. This modified request is received by a second server. This second server determines whether the first server is a trusted server based on the information, and provides access to the resource in response to a determination that the first server is a trusted server. If the second server receives the request directly from a client, it would process the request by itself instead of basing its trust on any of the known first servers.

21 Claims, 7 Drawing Sheets

Figure 4A

400 com.ibm.websphere.security.trustassociation.enabled=true  ⟵402
com.ibm.websphere.security.trustassociation.types=webseal36  ⟵404
com.ibm.websphere.security.trustassociation.webseal36.interceptor=com.ibm.ejs.security.web.WebSealTrustAssociationInterceptor  ⟵406
com.ibm.websphere.security.trustassociation.webseal36.config=webseal36a  ⟵408

412 webseal36a.properties:
com.ibm.websphere.security.webseal36.id=iv-creds
com.ibm.websphere.security.webseal36.hostnames=vivaldi.raleigh.ibm.com, vivaldi
com.ibm.websphere.security.webseal36.ports=444

```
package com.ibm.websphere.security.web;
public interface TrustAssociationInterceptor
{
/**
Every interceptor should know which HTTP requests originate from
the third party server that it is supposed to work with.
Given an HTTP request, this method must be used to determine whether
or not this interceptor is designed to process the request, in
behalf of the trusted server it is designed to interoperate with.
If the return value is false or an exception is thrown, then
WebSphere will consider that the request is not routed via the
trusted proxy server the interceptor is designed to handle.
WebSphere will pass the request to the next interceptor till there
is no more interceptors available, in which case it will be treated
to be a directly submitted request.

**/
public boolean isTargetInterceptor(HttpServletRequest req)         } 702
throws WebTrustAssociationException;
/**
This method is used to determine whether the interceptor trusts the
server through which the request has been routed. This may involve
authenticating the server in some manner. All the required
Information to perform this operation should be available in the
HTTP request.
If the third party server failed the validation, or is unable to
provide the required information, a
WebTrustAssociationFailedException must be thrown. This would be
treated as an authentication failure and WebSphere would deny
access to the requested secure resource.
**/
public void validateEstablishedTrust (HttpServletRequest req)      } 704
throws WebTrustAssociationFailedException;
/**
This method is used to retrieve the username of the end client
(or the originator of the HTTP request). This method will be
invoked if the validateEstablishTrust method invocation was
successful.
The method returns a string. A return value of null or a
WebTrustAssociationUserException should be thrown if the username
is not available in the request header or the implementation
determines that the username provided was invalid (based on some
criteria, e.g., a list of valid usernames may have been
decided earlier).
**/
public String getAuthenticatedUsername (HttpServletRequest req)    } 706
throws WebTrustAssociationUserException;
```

METHOD AND APPARATUS FOR PROCESSING REQUESTS IN A NETWORK DATA PROCESSING SYSTEM BASED ON A TRUST ASSOCIATION BETWEEN SERVERS

FIELD OF THE INVENTION

The present invention relates generally to an improved data processing system, and in particular to a method and apparatus for processing requests. Still more particularly, the present invention provides a method and apparatus for authenticating the users making the requests and providing a trusted association between servers that handle the requests.

BACKGROUND OF THE INVENTION

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Users exploring the Web have discovered that the content supported by HTML document format on the Web was too limited. Users desire an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Through applets and Web pages, users generate requests to access resources on the Web. Reverse Proxy servers may be used to act as a gateway into an Intranet environment. The users trying to access a resource will make requests to a reverse proxy server which would forward the request to a backend server that processes that particular requests. It is common for using these reverse proxy servers for authentication purposes as well. In other words, these servers make sure that users are who they say they are in a request This authentication may take many different forms, including the use of user IDs and passwords. Before forwarding this request to the backend server, the reverse proxy server might include and/or modify information on the authenticated user's identity. This may be in the form of a header, a credential token or in some other authentication data format. Thereafter, authenticated requests are sent to backend services for processing. The present invention recognizes that most backend services do not understand or recognize credential information that might be passed along with or within a request from a reverse proxy server. It also recognizes the fact that the backend server must trust the reverse proxy server in order to accept and work with the forwarded request.

Therefore, it would be advantageous to have an improved method and apparatus for handling authentication of requests between different servers that have established a trust relationship.

SUMMARY OF THE INVENTION

The present invention provides a method, apparatus, and computer implemented instructions for handling requests in a network data processing system. The network data processing system includes a network and clients connected to the network. A first server is present in which the first server receives a request from a client to access a resource, performs an authentication process with the client, adds and/or modifies information in the request in which the information indicates that the request is from a trusted source to form a modified request, and sends the modified request for processing. This modified request is received by a second server. This second server determines whether the first server is a trusted server based on the information, and provides access to the resource in response to a determination that the first server is a trusted server, the trusted server has already authenticated the end user who made this request and the end user is authorized to the requested resource.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A and 4B are diagrams illustrating properties files used for recognizing trusted servers in accordance with a preferred embodiment of the present invention;

FIG. 7 is a diagram of code used in an interceptor in accordance with a preferred embodiment of the present invention.

DETAILED DESCRIPTION OF THE PREFERRED EMBODIMENT

Figure 1:
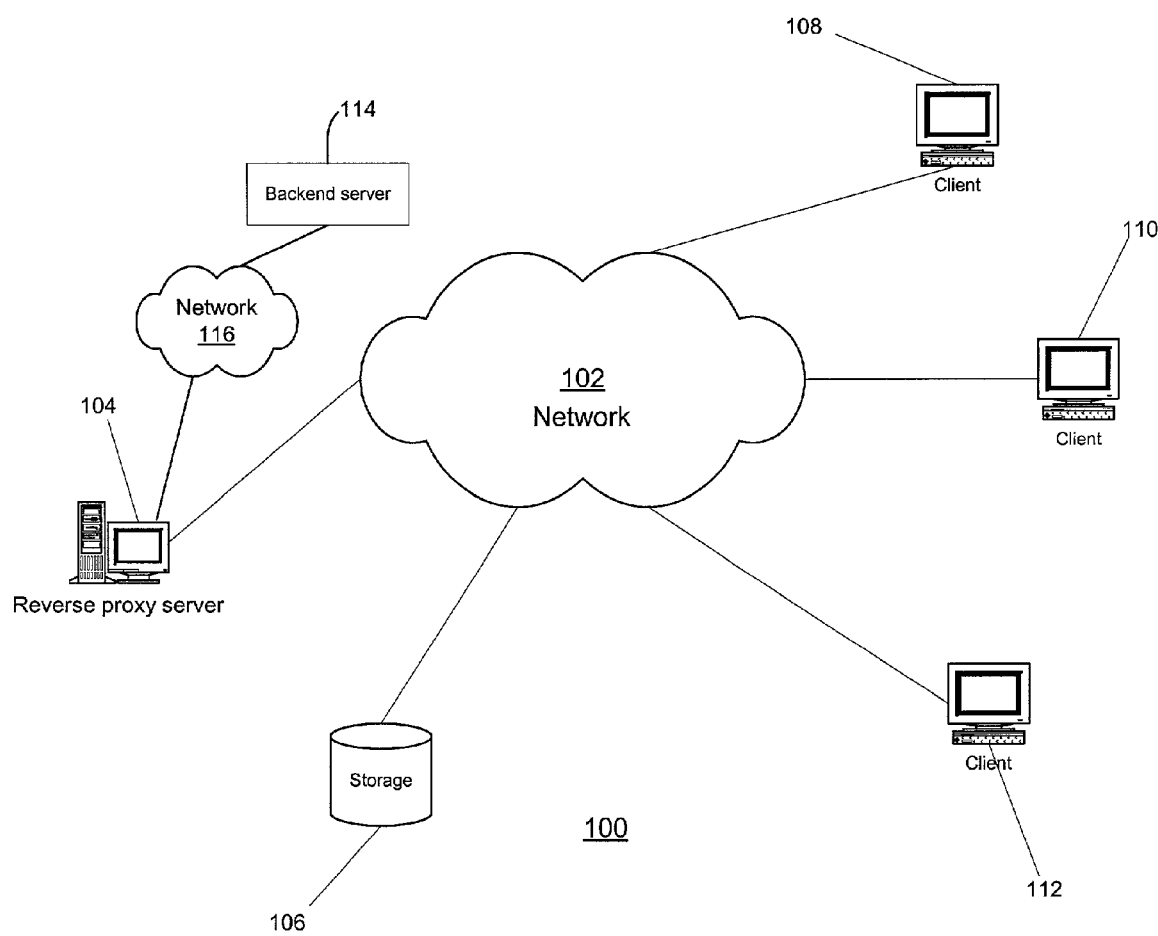
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. Additionally, server 114 is connected to server 104 via network server 116. In the depicted examples, server 104 is a reverse proxy security server, while server 114 is a backend server. A proxy server is also called a "proxy" or "application level gateway". A proxy server is an application that breaks the connection between sender and receiver. All input is forwarded out a different port, closing a straight path between two networks and preventing a hacker from obtaining internal addresses and details of a private network.

Proxy servers are for requests going "out" from a computer and simulates to the end server that it is coming from an entity (does not disclose the requesting machine). A reverse proxy server is the opposite—it hides the servers that serve the request but not the clients that request the resource. Proxy servers are available for common Internet services; for example, an HTTP proxy is used for Web access, and an SMTP proxy is used for e-mail. Proxies generally employ network address translation (NAT), which presents one organization-wide IP address to the Internet. It funnels all user requests to the Internet and fans responses back out to the appropriate users. Proxies may also cache Web pages, so that the next request can be obtained locally. In the depicted examples, server 104 is a reverse proxy security server, which is used to authenticate users requesting access to resources or services provided by server 114.

In the depicted example, server 114 provides data, such as boot files, operating system images, and applications to clients 108-112. This access is provided once users requesting these resources are authenticated by server 104. If a user is authenticated by server 104, server 104 will include or associate additional information with the request and pass that request to server 114. Server 114 will recognize server 104 as a trusted server based on the added information. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
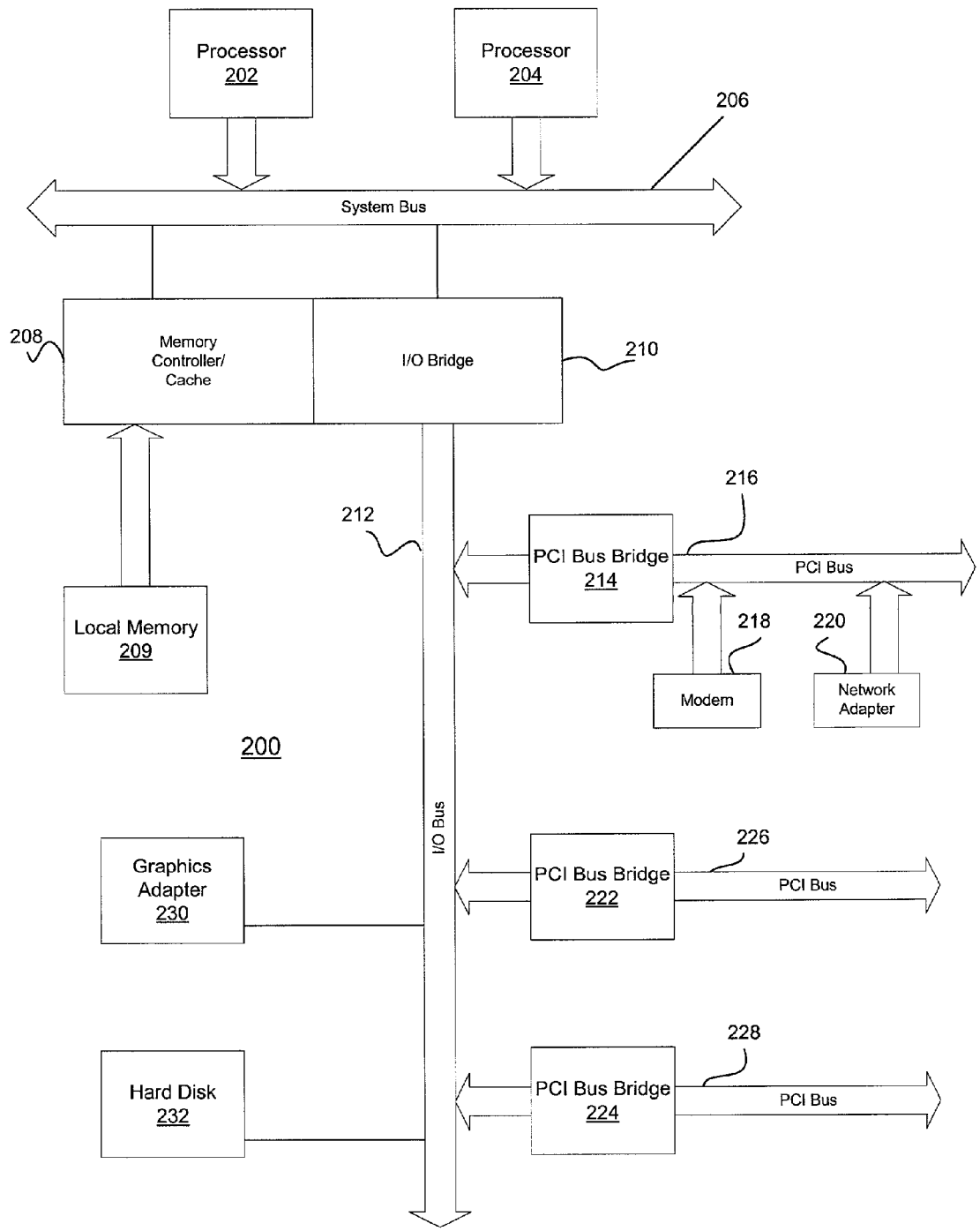
FIG. 2 is a block diagram of a data processing system that may be implemented as a server, such as server 104 in FIG. 1, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

The present invention provides a method, apparatus, and computer implemented instructions for authenticating and handling requests within a network data processing system. The present invention recognizes that, in presently available systems, backend servers are unable to understand the format of credential information that may be passed to them by a reverse proxy security server. More specifically, a reverse proxy security server performs authentication on a coarse granularity based on a first invocation of a server, such as a Web application server, residing behind the reverse proxy security server. After initial security checks, the reverse proxy security server forwards the request to the Web application server along with credential information about the user generating the request. In these examples, this information is included within the request itself. The present invention provides a mechanism for a Web application server to authenticate or establish a trust relationship with the reverse proxy security server forwarding the request.

Further, the mechanism of the present invention allows a Web application server to understand the format of the information added to the request by the reverse proxy security server. In these examples, the mechanism involves the use of a trust association interceptor placed on the Web application server. An interceptor is present for each type of reverse proxy security server to handle requests and determine whether a trust relationship exists, as well as to understand the format of the information provided by the reverse proxy security server.

Figure 3:
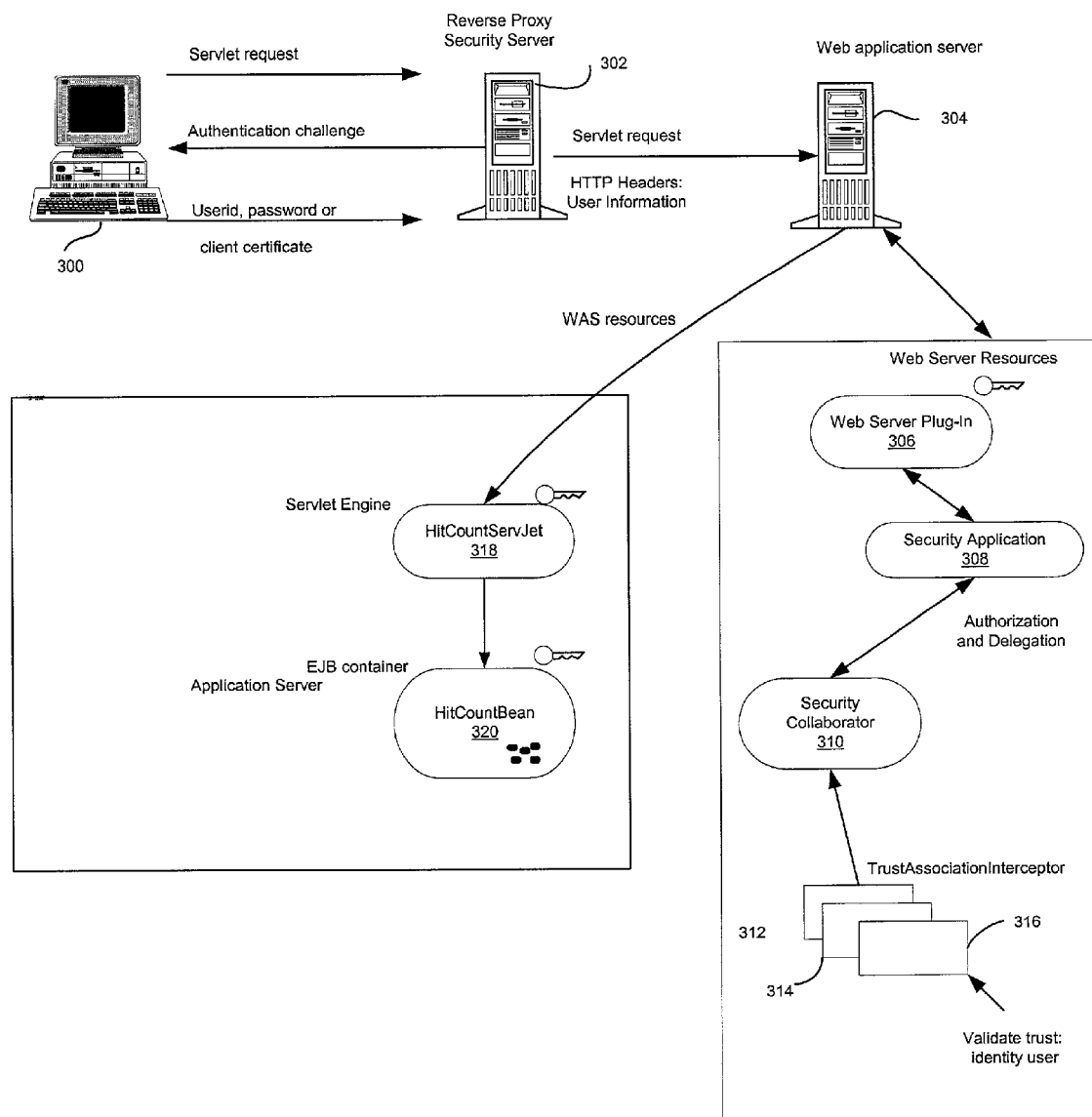
FIG. 3 is a diagram illustrating components used in forming authentication of requests in accordance with a preferred embodiment of the present invention.

Turning next to FIG. 3, a diagram illustrating components used in forming authentication of requests is depicted in accordance with a preferred embodiment of the present invention. In this example, a user at client 300 generates a request to a servlet, which is received by reverse proxy security server 302. For example, the user may enter a URL in a Web browser, which results in a generation of the request. Reverse proxy security server 302 will consult a configuration database and determine whether the requested URL is protected. If this URL is a protected URL, then an authentication process is initiated. Authentication of the user is performed by reverse proxy security server 302 through an issuance of an authentication challenge to the user client 300. This challenge may, for example, request a user ID and password or a client certificate. A response is returned to reverse proxy security server 302 by client 300.

If authentication of the user is successful, then reverse proxy security server 302 adds credential information to the request and passes the request to Web application server 304 for processing. In the depicted examples, information is placed into the header of the request. For example, a value may be included to represent a valid name in a database maintained by Web application server 304. In these examples, the requests are HTTP requests and the information is placed into a HTTP header. When the request is received by Web application server 304, this server will determine whether the requested resource is a protected one.

In the depicted examples, the determination is provided by Web server plug-in 306, which manages resources in Web application server 304. If the resource is a protected resource, Web application server 304 is configured to recognize that the request is from a trusted server, such as reverse proxy security server 302. Security application 308 determines whether the resource is a protected one. Security collaborator 310 is configured to recognize that a reverse proxy security server authentication service is present as a front end to Web application server 304.

The identification of this trust relationship is implemented using trust association interceptors 312, 314, and 316 in these examples. A trust association interceptor is present for every type of reverse proxy security server that acts as a front end to Web application server 304. Each one of the interceptors is presented with the request in these examples. If the request is accepted to be handled by an interceptor, the interceptor is asked to validate the trust relationship. If that succeeds, a trust relationship is then recognized as being present. That interceptor also retrieves user information present within the headers of the forwarded request. The retrieved information is validated. In other words, the credential passed in by the reverse proxy security server is analyzed to obtain the user information from the credential information and a determination is made as to whether the user information is present within a database of user information in the web application server.

Upon successful validation of the user, this information is then used to determine whether the user is authorized to access the resource in the request. For example, a user name may be compared against a user database or registry to determine whether the user is allowed to access the resource. In this example, the determination is made by security collaborator 310, consulting with security application 308. If the user is authorized to access the resource, then a security context with the user's credential information is generated and passed on to servlet engine 318.

The request is passed to servlet engine 318 regardless of the result of the authorization check described above. In this example, servlet engine 318 is a hit count servlet used to count the number of requests for a URL. Servlet 318 will invoke a method on a Java bean 320. In the depicted examples, a method call from servlet 318 to Java bean 320 causes a security check to be performed by security collaborator 310 to determine whether the user is authorized to invoke the method on Java bean 320. If the user is authorized to invoke the method, then the method is executed and results are returned to the user at client 300.

In these examples, Web server plug-in 306, security application 308, security collaboration 310, and trust association interceptors 312–316 are components within Web application server 304.

Turning next to FIGS. 4A and 4B, diagrams illustrating an example of how the system can be configured using a set of property files. The properties files used for recognizing trusted servers are depicted in accordance with a preferred embodiment of the present invention. In FIG. 4A, property file 400 illustrates how to enable trust association between the Web Application Server and the reverse proxy servers, as shown in line 402. In line 404, the types of reverse proxy servers that are currently available as a front end to the Web Application Server can be specified. In the example, there is only one reverse proxy server and the type is webseal36. Every reverse proxy server type must have a corresponding interceptor. In line 406, the interceptor for webseal36 is implemented by the specified Java class. Optionally, every interceptor may have its own configuration or property file. In line 408, the name of the property file for the webseal36 interceptor type is specified.

In FIG. 4B, property file 410 illustrates an exemplary property file of a given interceptor. The file defines information that will be provided by the interceptor's corresponding reverse proxy security server. In this example, line 412 specifies the string "iv-creds" as the specific id information that will be added by the proxy server to the request to signify to the interceptor that the request has been authenticated by that proxy server.

Figure 5:
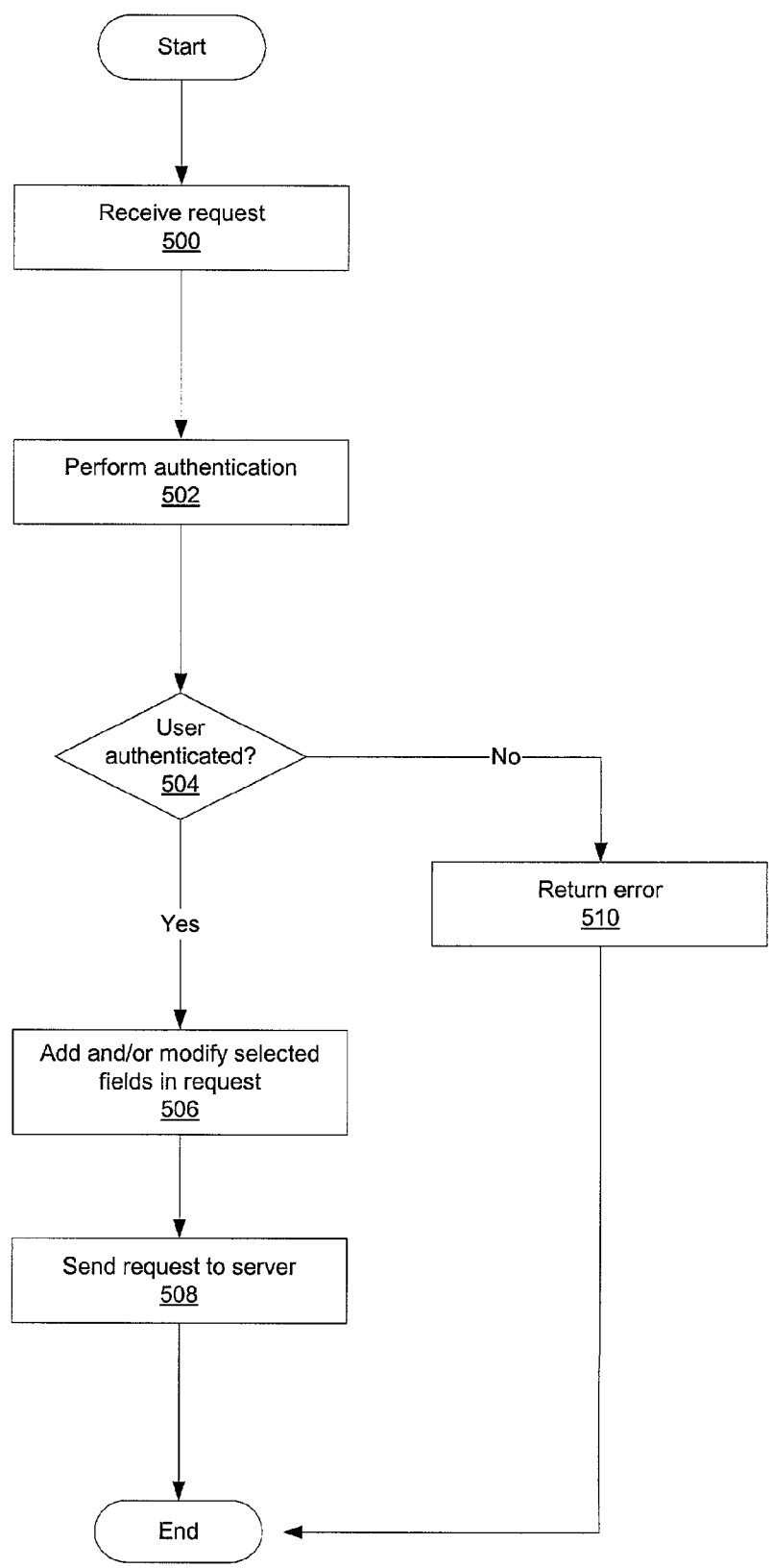
FIG. 5 is a flowchart of a process used for handling a user request at reverse proxy security server in accordance with a preferred embodiment of the present invention.

Turning now to FIG. 5, a flowchart of a process used for handling a user request at reverse proxy security server is depicted in accordance with a preferred embodiment of the present invention. The process illustrated in FIG. 5 may be implemented in a reverse proxy security server, such as server 104 in FIG. 1.

The process begins by receiving a request from a user at a client (step 500). In this example, this request may be initiated by a user entering or selecting a URL. Authentication is then performed on the request, as needed (step 502). The process may identify whether the URL is protected. The authentication step includes issuing a challenge and receiving a response from the user. The challenge may be, for example, a request for a user ID and password.

A determination is made as to whether the user has been authenticated (step 504) or not. If the user is authenticated, then one or more selected fields or values are added or modified to the request (step 506). This new information may include, for example, user identification information and an identification of the reverse proxy security server. The request is then sent to the backend server (step 508) with the process terminating thereafter.

Turning back to step 504, if the user is not authenticated, an error is returned (step 510) with the process terminating thereafter. In this example, the error is returned to the user, indicating that authentication has not occurred. Alternatively, the user may be prompted to retry authentication, depending on the particular implementation.

Figure 6:
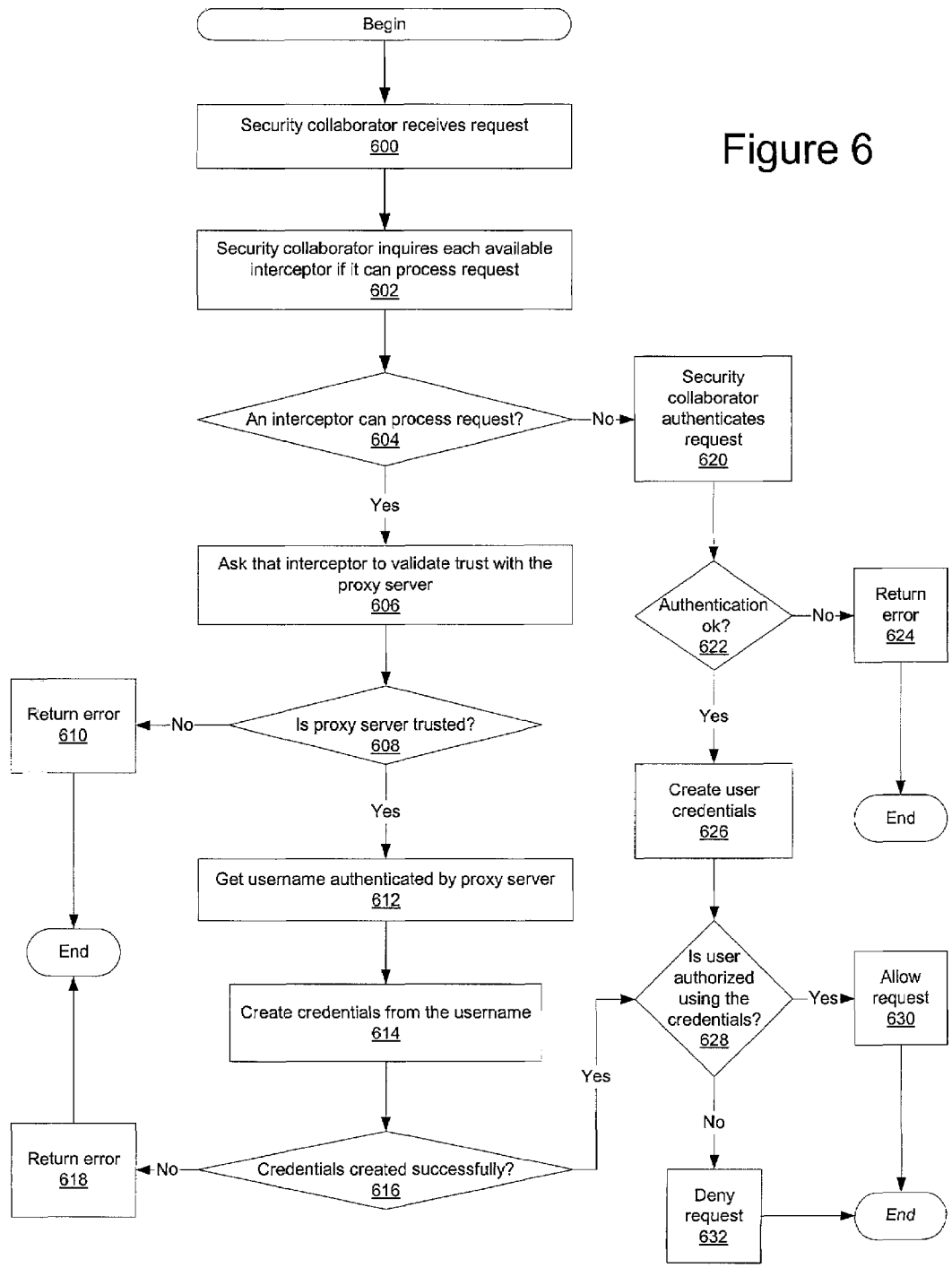
FIG. 6 is a flowchart of a process used for handling requests forwarded from a reverse proxy security server in accordance with a preferred embodiment of the present invention.

Turning next to FIG. 6, a flowchart of a process used for handling requests forwarded from a reverse proxy security server is depicted in accordance with a preferred embodiment of the present invention. The process illustrated in FIG. 6 may be implemented in a server, such as, server 114 in FIG. 1. More specifically, the process illustrated may be implemented in a security collaborator together with an interceptor on the server.

The process begins with the security collaborator receiving a request (step 600). The request is sent to each available interceptor. Next, the security collaborator inquires each available interceptor if it can process the request (step 602). Each interceptor determines whether it is able to process the request and returns the result to security collaborator. A determination is made by the Security Collaborator as to whether any of the available interceptors responded positively to the inquiry (step 604).

If an interceptor is available to process the request, that interceptor is asked to validate trust with the proxy server (step 606). This helps the backend server to support multiple reverse proxy security servers (e.g., different types or different security restrictions depending on the way they are deployed). The selected interceptor might require a user name representing the proxy server and password within the request. This determination may be made by comparing the values to expected values located in a data structure, such as a registry table or database. The presence of a value or field within a header may suffice or a specific value may be expected.

Then, a determination is made as to whether the proxy server is trusted (step 608). If the proxy server is not trusted, an error is returned (step 610) with the process terminating thereafter.

If the proxy server is trusted, the username authenticated by the proxy server is retrieved (step 612). Next, credentials are created from the username (step 614). A determination is then made as to whether or not the credentials were created successfully (step 616). If the credentials were not created successfully, an error is returned (step 618). If the credentials were created successfully, the process proceeds to step 628 to begin authorization as will be described below.

With reference again to step 604, if it has been determined that no interceptor can process a request, the security collaborator itself will authenticate the request (step 620). This is for the cases where the request might be directed from a user directly to the backend server instead of going through a reverse proxy security server. A determination is made as to whether the authentication is okay (step 622). If the authentication is unsuccessful, an error is returned (step 624) with the process terminating thereafter. If the authentication is successful, user credentials are created (step 626). Then, a determination is made as to whether the user is authorized using the credentials (step 628). If the user is authorized using the credentials, the request is allowed (step 630) with the process terminating thereafter. If the user is not authorized using the credentials, the request is denied (step 632) with the process terminating thereafter.

Turning now to FIG. 7, a diagram of application program interfaces (APIs) available in an interceptor are depicted in accordance with a preferred embodiment of the present invention. Code 700 is the set of APIs required upon every interceptor to implement in order to be able to collaborate with a Web Application server such as server 304 in FIG. 3. More specifically, these API's are called by the Security Collaborator such as 310 in FIG. 3. Code 700 is written in Java in this example.

Trust association is specific to the characteristics of each type of reverse proxy security server. An interceptor is present for each type of reverse proxy security server. For example, a user ID and password may be present in an HTTP authorization header to validate the credentials of the reverse proxy security server. Code 700 performs validation of the presence of this information, as well as extracting information for further use.

Section 702 is used to determine whether this interceptor is designed to process a particular request. This corresponds to the call made by the Security Collaborator to the interceptor in step 602 of FIG. 6. Section 704 is used to determine whether the interceptor trusts the server through which the request has been routed. This corresponds to the call made by the Security Collaborator to the interceptor in step 606 of FIG. 6. If the server fails validation or is unable to provide the required information, an exception is thrown, which causes a denial of access to the requested resource.

Section 706 is used to retrieve the user name of the client originating the request. This corresponds to the call made by the Security Collaborator to the interceptor in step 612 of FIG. 6. This section is invoked if the validation of the server is successful.

Thus, the present invention provides a method, apparatus, and computer implemented instructions for handling requests received from a proxy server at a backend server. The mechanism involves establishing whether the server forwarding the request is a trusted server. This validation, in these examples, involves determining whether values are present within a request in the expected locations, as well as validating the values. The mechanism also involves extracting user information to further determine whether access to the request resource is authorized.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for authenticating a request, the method comprising:
   receiving, by a first security server, a request from a client;
   performing authentication of the request by the first security server;
   adding, by the first security server, information to the request to form a modified request, wherein the information indicates that the request is from a trusted source;
   sending, by the first security server, the modified request to a web application server;
   presenting the modified request to each of a plurality of components of the web application server, wherein each of the plurality of components correspond with a respective one of a plurality of security servers; and
   validating, by a one of the plurality of components that corresponds with the first security server, the modified request.

2. The method of claim 1, wherein the request is a request to access data.

3. The method of claim 1, wherein the first security server is a reverse proxy server.

4. The method of claim 1, wherein the information includes a user identification.

5. The method of claim 4, wherein the user identification is a user name and password.

6. The method of claim 1, wherein the information includes an identification of the first security server.

7. The method of claim 1, wherein the step of validating further comprises determining that a value of the information is an expected value located in a data structure.

8. The method of claim 1, wherein each of the plurality of components is implemented as a respective interceptor.

9. A data processing system comprising:
   a bus system;
   a communications unit connected to the bus system;
   a memory connected to the bus system, wherein the memory includes a plurality of components as a set of instructions; and
   a processing unit connected to the bus system, wherein the processing unit, responsive to receiving a modified request from a first security server of a plurality of security servers, executes the set of instructions and presents the modified request to each of the plurality of components of the data processing system, wherein each of the plurality of components corresponds with a respective one of the plurality of security servers, and wherein the processing unit, responsive to execution of one of the plurality of components that corresponds with the first security server, determines whether an expected value of information added to the modified request by the first security server is present in the modified request and processes the modified request, in response to the expected value being present in the modified request, wherein the modified request is generated from a request originated by a client and modified by the first security server to include the added information.

10. A network data processing system comprising:
    a network;
    a plurality of clients connected to the network;
    a first security server connected to the network, wherein the first security server receives a request from a client to access a resource, performs an authentication process with the client, adds information to the request in which the information indicates that the request is from a trusted source to form a modified request, and sends the modified request for processing; and
    a second server connected to the network and having a plurality of components, wherein the second server receives the modified request from the first security server, presents the modified request to each of the plurality of components each respectively corresponding to one of a plurality of security servers, determines whether the first server is a trusted server based on a determination made by a first component of the plurality of components that corresponds with the first security server, and provides access to the resource in response to a determination that the first server is a trusted server.

11. The network data processing system of claim 10 further comprising a second security server connected to the network, wherein the second security server receives requests from clients to access the resource, performs an authentication process with the clients, adds information to the requests in which the information indicates that the requests are from a trusted source to form modified requests, and sends the modified requests to the second server for processing, wherein the second server presents the modified requests of the second security server to each of the plurality of components and determines whether the second security sever is a trusted server based on a determination made by a second component that corresponds with the second security server, wherein the first component and the second component provide different security restrictions.

12. The network data processing system of claim 10, wherein the network is at least one of a local area network, an intranet, an extranet and an Internet.

13. The network data processing system of claim 10, wherein the plurality of components comprise a set of interceptors in which the set of interceptors are used to determine whether the first security server is a trusted sewer, wherein the request is sent to each of the set of interceptors to determine whether the interceptors can handle the request.

14. The network data processing system of claim 10, wherein the second server receives the request directly from the client.

15. A data processing server for processing a request, the data processing server comprising:

receiving means for receiving a modified request from a first security server of a plurality of security serves, wherein the modified request is generated from a request originated by a client and the modified request includes information added by the first security server;

a plurality of determining means, each of which receives the modified request, for determining whether the information present in the modified request has an expected value, wherein each of the plurality of determining means corresponds to one of the plurality of security servers; and processing means for processing the modified request in response to a one of the plurality of determining means determining the information has the expected value.

16. The data processing system of claim 15, wherein the modified request requests access to a resource, the data processing system further comprising:

second determining means for determining whether a user of the client is authorized to access the resource; and accessing means for accessing the resource using the modified request in response to a determination that the user is authorized.

17. The data processing system of claim 15, wherein the first security server is a reverse proxy server.

18. The data processing system of claim 15, wherein the information is an identification of the first security server.

19. The data processing system of claim 15, wherein the information is a user name and password of a user of the client.

20. The data processing system of claim 15, wherein the plurality of determining means includes a set of interceptors that can provide different security restrictions to a resource.

21. A computer program product in a computer readable medium for processing a request, the computer program product comprising:

first instructions for receiving a modified request from a first security server, wherein the modified request is generated by the first security server by modifying information in a request originated by a client;

second instructions for determining one of a plurality of interceptors that can process the modified request by presenting the modified request to each of the plurality of interceptors, wherein each of the plurality of interceptors corresponds to one of the plurality of security servers;

third instructions for determining whether a value of the information present in the modified request is an expected value; and fourth instructions, responsive to the value of the information being the expected value, for processing the modified request.

* * * * *

UNITED STATES PATENT AND TRADEMARK OFFICE
CERTIFICATE OF CORRECTION

PATENT NO. : 6,965,939 B2
DATED : November 15, 2005
INVENTOR(S) : Cuomo et al.

It is certified that error appears in the above-identified patent and that said Letters Patent is hereby corrected as shown below:

Column 10,
Line 66, after "trusted" delete "sewer" and insert -- server --.

Column 11,
Line 9, after "plurality of security" delete "serves" and insert -- servers --.

Signed and Sealed this

Seventh Day of March, 2006

JON W. DUDAS
*Director of the United States Patent and Trademark Office*